United States Patent
Franzen et al.

(10) Patent No.: US 8,998,024 B2
(45) Date of Patent: Apr. 7, 2015

(54) DEVICE FOR STORING LOW-MOLECULAR GASES

(75) Inventors: Jens Franzen, Stuttgart (DE); Gerardo Friedlmeier, Leinfelden-Echterdingen (DE); Kai Kioschis, Landau (DE); Detlef Zur Megede, Kirchheim (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/814,307

(22) PCT Filed: Jul. 26, 2011

(86) PCT No.: PCT/EP2011/003727
§ 371 (c)(1),
(2), (4) Date: Mar. 22, 2013

(87) PCT Pub. No.: WO2012/016655
PCT Pub. Date: Feb. 9, 2012

(65) Prior Publication Data
US 2013/0174920 A1    Jul. 11, 2013

(30) Foreign Application Priority Data

Aug. 6, 2010  (DE) .......................... 10 2010 033 597

(51) Int. Cl.
*F16K 15/02*    (2006.01)
*F17C 1/16*     (2006.01)

(52) U.S. Cl.
CPC ................. *F16K 15/021* (2013.01); *F17C 1/16* (2013.01); *F17C 2201/0109* (2013.01);
(Continued)

(58) Field of Classification Search
CPC ............... F17C 1/16; F17C 1/06; F17C 1/04; F17C 2203/0663; B60K 15/03519; B60K 15/03504; B60K 15/035; B60K 15/03006; B60K 2015/03514; F16K 31/566; F16K 31/563; F16K 31/56; F16K 1/2071; F16K 15/033; F16K 15/03; F16K 17/04; F16K 17/0413; F16K 17/196; F16K 31/1262
USPC .......... 220/589, 588, 586, 62.19, 581, 203.24, 220/203.23, 203.19, 203.28, 203.11, 220/203.01; 137/217, 216, 215; 206/0.6; 251/74, 177, 176, 193, 303, 337
See application file for complete search history.

(56) References Cited

U.S. PATENT DOCUMENTS 3,282,757 A * 11/1966 Brussee ........................ 156/69
3,431,949 A   3/1969 Uto et al.
(Continued)

FOREIGN PATENT DOCUMENTS

CN      1563781 A      1/2005
CN    101410666 A      4/2009
(Continued)

OTHER PUBLICATIONS

German-language Written Opinion (PCT/ISA/237) (six (6) pages).
(Continued)

*Primary Examiner* — Robert J Hicks
(74) *Attorney, Agent, or Firm* — Crowell & Moring LLP

(57) ABSTRACT

A device that stores a low molecular gas, such as hydrogen ($H_2$), under high pressure includes having an inner shell and at least one outer sleeve surrounding the inner shell. The region between the inner shell and the outer sleeve is connected via at least one valve with a backflow prevention capability to the region surrounded by the inner shell. The valve is thereby formed so that low molecular gas which has diffused through the inner shell can flow back into the inner shell when there are suitable pressure conditions.

9 Claims, 2 Drawing Sheets

(52) U.S. Cl.
CPC .. *F17C 2201/056* (2013.01).; *F17C 2203/0604* (2013.01); *F17C 2203/0619* (2013.01); *F17C 2203/066* (2013.01); *F17C 2203/0663* (2013.01); *F17C 2205/0335* (2013.01); *F17C 2205/0391* (2013.01); *F17C 2205/0397* (2013.01); *F17C 2221/012* (2013.01); *F17C 2223/0123* (2013.01); *F17C 2223/036* (2013.01); *F17C 2260/037* (2013.01); *F17C 2270/0168* (2013.01); *F17C 2270/0184* (2013.01); *Y02E 60/321* (2013.01)

(56) References Cited

U.S. PATENT DOCUMENTS

| | | | | |
|---|---|---|---|---|
| 4,225,051 | A | * | 9/1980 | Faudou et al. ............... 220/590 |
| 7,918,956 | B2 | | 4/2011 | Mehta et al. |
| 2009/0057319 | A1 | | 3/2009 | Schlag |

FOREIGN PATENT DOCUMENTS

| | | | |
|---|---|---|---|
| CN | 101676595 A | 3/2010 | |
| DE | 10 2008 039 573 A1 | 4/2009 | |
| JP | 2009-174700 A | 8/2009 | |
| WO | WO 0024641 A1 * | 5/2000 | ............... B65D 8/00 |
| WO | WO 02/33298 A1 | 4/2002 | |
| WO | WO 02/50470 A2 | 6/2002 | |

OTHER PUBLICATIONS

English translation of Chinese Office Action dated Dec. 3, 2013 (three (3) pages).
International Search Report with English translation dated Sep. 12, 2011 (four (4) pages).
German-language Written Opinion dated Sep. 12, 2011 (PCT/ISA/237) (six (6) pages).
Chinese Notification of Reason for Refusal dated Mar. 11, 2014 (Three (3) pages w/English translation (Two (2) pages).

* cited by examiner

DEVICE FOR STORING LOW-MOLECULAR GASES

BACKGROUND AND SUMMARY OF THE INVENTION

Exemplary embodiments of the present invention relate to a device for storing low molecular gases under high pressure.

Devices for storing gases or compressed gas storage elements are generally known. Typically, such compressed gas storage elements are sub-divided into different types. For example, a so-called type II compressed gas storage element is a compressed gas storage element with an inner shell made of high strength steel and an outer sleeve surrounding the inner shell, the outer sleeve being composed, for example, of fiber reinforced material. A type III pressure storage element comprises an inner shell composed of aluminum and a type IV pressure storage element typically comprises an inner shell made of a plastic material, for example high density polyethylene (HDPE), which is surrounded by at least one outer sleeve composed of fiber-reinforced material.

Such compressed gas storage elements serve as devices for storing gases under high pressures. In general, pressures are provided in the magnitude of approximately 350 bar, in the magnitude of approximately 700 bar or also in the magnitude of 1100 to 1200 bar in order to be able to store, particularly in case of light gases, a quantity of gas that is as large as possible with a comparatively manageable volume of the device.

If low molecular gases, in particular hydrogen, are stored under high pressure in the device for storing gas, it is practically unavoidable that small quantities of the low molecular gas will diffuse through the device and flow into the environment. This is generally unproblematic due to the comparatively small quantity.

In certain situations, however, a certain quantity of hydrogen has diffused through the inner shell and remains in the region between the inner shell and the outer sleeve. During normal operation, a slow diffusion of this hydrogen through the outer sleeve will then occur so that no problems arise. In case of a virtually empty compressed gas storage element, however, significant problems can arise. During refilling, a pressure increase arises relatively quickly in the inner shell from a very low residual pressure with virtually empty compressed gas storage element to a very high pressure with a completely filled compressed gas storage element, for example to a pressure in the magnitude of the abovementioned 700 bar. As the inner shell typically has a certain elasticity, and here in particular if it is formed as a plastic inner shell in a type IV compressed gas storage element, the relatively quick pressure increase leads to the gas cushions located between the inner shell and the outer sleeve—the gas cushions being composed of the low molecular gas that has diffused through the inner shell—being placed under a relatively high pressure. Under these conditions, the gas then passes comparatively quickly through the outer sleeve so that a gas cloud forms in this situation in the environment of the outer sleeve, the concentration of the gas cloud being significantly higher than in case of diffusion through the walls of the compressed gas storage element in normal operation. If the leak-tightness of the compressed gas storage elements is determined via corresponding detectors, in particular the leak-tightness of the compressed gas storage elements used to store combustion gas in vehicles, this concentration is typically so high that an alarm is triggered and this generally leads to an emergency disconnection of the system, for example to an emergency cessation of filling.

German Patent Document DE 2008 039 573 A1 discloses a compressed gas storage element constructed with an inner shell and at least one outer sleeve. In the region between the inner shell and the at least one outer sleeve, a diffusion layer is arranged that is designed so that the low molecular gas that has possibly diffused through the inner shell can be purposefully collected and carried away via a connection element. As this removal can take place with comparatively low pressure loss and thus offers a significantly lower diffusion resistance than the penetration of the outer sleeve, low molecular gas that may have diffused through the inner shell will follow this path and thus be purposefully removed from the region of the diffusion layer.

The structure thereby has the disadvantage that it requires comparatively high resources and does not limit gas losses from the compressed gas storage element but instead even encourages the diffusion through the inner shell, as it provides a path for outflow of the gas which has diffused through the inner shell with very low pressure loss and thus accelerates the diffusion through the pressure drop.

Exemplary embodiments of the present invention provide a structure of a device for storing low molecular gas under high pressure that avoids the aforementioned disadvantages, minimizes the gas loss through diffusion, and in particular prevents the problem of an abruptly increasing gas concentration in the environment of the device during filling.

According to exemplary embodiments of the present invention thus provides a device comprises at least one valve means with backflow prevention means in the region between the inner shell and the outer sleeve, connecting this region between the inner shell and the outer sleeve to the inside of the inner shell. The backflow prevention means is designed so that gas diffusing through the inner shell can flow back into the inner shell under suitable pressure conditions. The construction with the backflow prevention means thus allows gases to be able to flow back from the region between the inner shell and the outer sleeve into the region within the inner shell. During normal operation of the device the unavoidable losses of hydrogen will arise through diffusion of the hydrogen through the inner shell and then possibly also the outer sleeve. Typically, during normal operation of the device the low molecular gas under pressure is removed from the region of the device so that the device or the region in the inner shell gradually becomes empty and loses pressure. If this situation arises and low molecular gas is present in the region between the inner shell and the outer sleeve, the gas having diffused through the inner shell, this will flow back into the inner shell through the valve means with backflow prevention means when the pressure in the inner shell is lower than the pressure in the region between the inner shell and outer sleeve. Two effects can thereby be achieved. First, at least a part of the low molecular gas that diffused through the inner shell is recovered insofar as it can flow back into the region of the inner shell if the device is empty or virtually empty. In addition, when the device is comparatively empty such a backflow is facilitated so that no, or only very little, low molecular gas is found between the inner shell and the outer sleeve in these operating conditions. If the device is now filled and the inner shell is thus impacted in a comparatively short time with a relatively high pressure, no or at best very little gas can be pressed through the outer sleeve so that an increase in the concentration of the low molecular gas in the environment of the device is securely and reliably avoided during filling.

The particular advantage of the structure thus lies in that safety-critical situations during filling due to gas leaving the region between the inner shell and outer sleeve are prevented and at the same time at least a part of the gas that diffused through the inner shell can flow back into the inside of the inner shell and can be used there. The backflow prevention means is thereby formed so that a through-flow from the region of the inner shell into the region between the inner shell and outer sleeve is prevented.

According to a particularly favorable and advantageous development of the device according to the invention, the at least one valve means is pre-tensioned via a spring means in the closed state. Such pre-tensioning via a spring means, which can be formed, for example, as a helical spring, pressure spring or a torsion spring at a suspension point of a flap or similar in such a way that it presses the non-return means of the valve means in support of the pressure of the gas in the inner shell into the closed state. Only when a clear pressure difference arises between the region between the inner shell and the outer sleeve on the one hand and the inner shell on the other hand will the at least one valve means open against this spring force and allow the gas under high pressure to flow from the region between the inner shell and the outer sleeve back into the region of the inner shell. The spring means can thus prevent an opening of the valve means taking place with comparatively balanced pressure situations, so that gas found inside the inner shell could flow out through the valve means into the region between the inner shell and the outer sleeve. This is particularly the case when comparatively high pressures exist that are transferred through an inner shell having a certain elasticity in the manner of a membrane onto the region between the inner shell and the outer sleeve. In case of virtually equal pressures, inadvertent opening could arise in situations in which this is undesirable. Through the spring means in the development according to the invention as described, this is securely and reliably prevented.

According to a further particularly favorable embodiment of the device according to the invention the at least one valve means is designed so that its largest structural expansion is provided inside the inner shell. This structure could be realized, for example, in the form of a spring-loaded flap inside the inner shell that closes openings in the inner shell in the normal state and releases them when the pressure in the region of the inner shell is significantly lower than the pressure in the region between the inner shell and outer sleeve. The structural integration into the inside of the inner shell then allows the conventional structure of the device, for example as a type IV compressed gas storage element, so that the inner shell with incorporated valve means can have fibers soaked with bonding agent wound around it without problems without the valve means or similar projecting over the profile of the inner shell and impairing the structure through a change to the geometric form of the outer sleeve or weakening it in its stability.

According to an alternative or supplementary embodiment of the device according to the invention the at least one valve means is arranged in the region of a connection element for filling/removing the low molecular gas. One or also one of a plurality of valve means can thus be provided in the region of the connection element. In such a connection element there is typically a passage through the different layers of the structure of the device. The connection element is thus connected on its end face both to the inner shell and also the outer sleeve. There is thus also a region of the connection element between these two regions, the region being connected to the region between the inner shell and outer sleeve. A connection to the inside of the inner shell can be produced from this region for example through a borehole or similar. A conventional non-return valve, in particular a spring loaded non-return valve, can then be incorporated into this connection according to the above-described embodiment. At least one of the at least one valve means can be integrated into the structure of the connection elements without notable additional resources.

According to a particularly favorable and advantageous development of the device according to the invention the low molecular gas is hydrogen. In particular when hydrogen is stored, for example under pressures of more than 350 or in particular more than 650 bar, a diffusion through the inner shell of the device inevitably arises so that, particularly with the storage of hydrogen, it is ensured through the material absorbing the hydrogen that unacceptably high hydrogen concentrations in the environment of the device can be prevented during filling. As hydrogen together with oxygen can form an ignitable mixture, a necessary safety-based disconnection can be avoided in case of an unacceptably high hydrogen concentration in the environment of the device.

A particularly preferred use of the device according to the invention in one of the abovementioned embodiments is given when it is a compressed gas storage element that must be comparatively frequently emptied and re-filled. The device can thus be used in particular to store fuel in a vehicle. Such a vehicle, which is operated for example via an internal combustion engine with hydrogen or another low molecular gas, can be equipped particularly efficiently with the device.

Due to the typically relatively high consumption of fuel, lengthy storage times of the fuel in the device are not expected so that the diffusion that is unavoidable at least in case of hydrogen does not constitute a great problem. Since, however, the device for storing the gas must be filled relatively frequently, the solution according to the invention, which prevents an unacceptably high concentration of the gas around the device during filling thereof, constitutes a decisive advantage for this type of application.

A particularly preferred purpose of use thereby lies in the field of fuel cell vehicles, in which the hydrogen can be stored in such devices according to the invention in a particularly user-friendly manner, as these can store an adequate quantity of hydrogen—for example with a pressure level of 700 bar and justifiable volume—in order to achieve a good operating range of the vehicle. Unpleasant emergency disconnections during filling can thereby be avoided reliably and without safety risk.

BRIEF DESCRIPTION OF THE DRAWING FIGURES

Further advantageous embodiments of the device according to the invention thereby follow from the remaining dependent claims and will become clear using the exemplary embodiment which is explained in greater detail below by reference to the drawing, in which:

DETAILED DESCRIPTION

Figure 1:
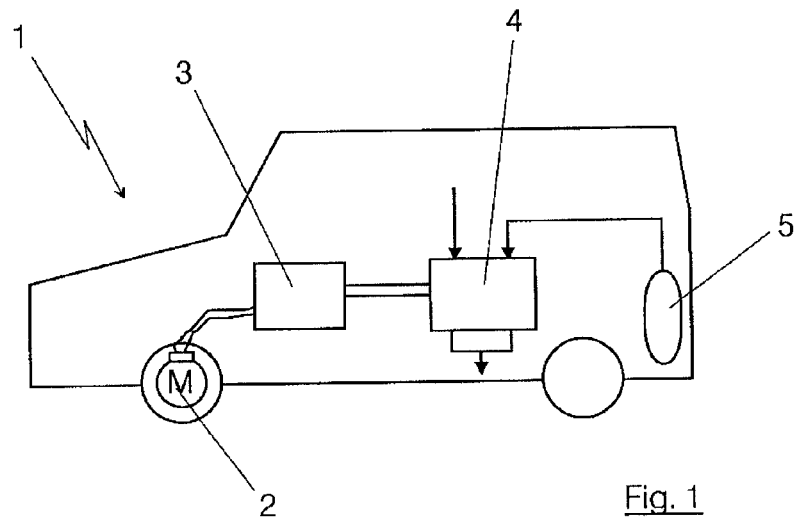
FIG. 1 shows the working principle of a fuel cell vehicle with a device according to the invention for storing hydrogen.

FIG. 1 illustrates a vehicle 1, which is principally driven by means of an electric motor 2 indicated in the region of the wheels, whereby this electric motor 2 is supplied via an electronic power unit 3 with electrical power from a fuel cell 4 in a manner known in itself. The electronic power unit 3 can thereby further comprise an electric intermediate storage element, for example a battery. The intermediate storage element can be used in particular to receive recovered brake energy. Oxygen or air and hydrogen $H_2$ are fed to the fuel cell 4 in a known manner in order to produce the electrical power. The hydrogen comes from one or more devices 5 arranged distributed around the vehicle 1 for storing hydrogen $H_2$ under high pressure. The device or the compressed gas storage element 5 is typically operated at a pressure level of for example 350 or 700 bar and is supposed to be formed in the exemplary embodiment shown here as a so-called type IV compressed gas storage element 5.

Figure 2:
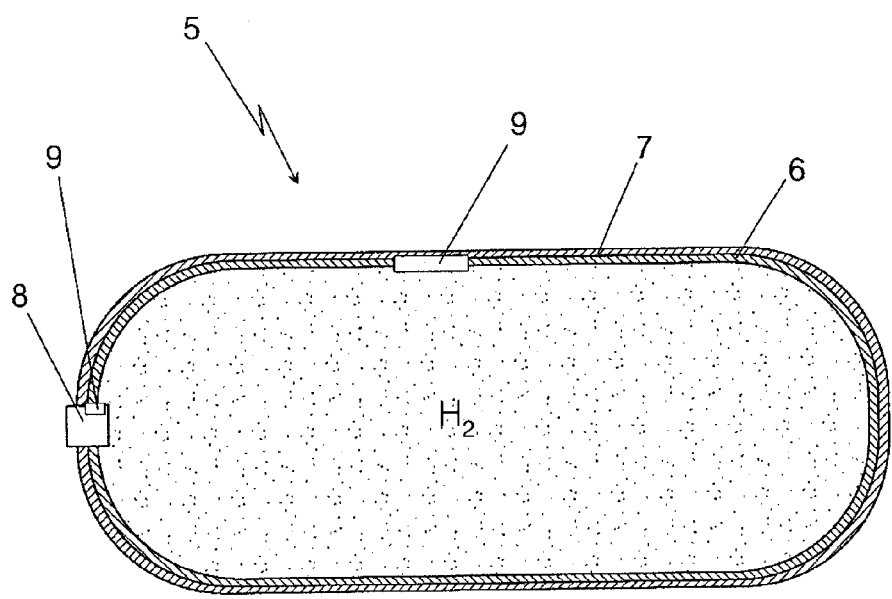
FIG. 2 shows the device according to the invention for storing hydrogen in a cross-section.

Such a type IV compressed gas storage element thereby consists, as can be seen in more detail in the sectional illustration of FIG. 2, of an inner shell 6 and at least one outer sleeve 7 surrounding the inner shell 6, whereby them outer sleeve 7 can be constructed for example from one or more layers. In case of a type IV compressed gas storage element as a device 5, the inner shell 6 is thereby produced from a plastic, typically a high density polyethylene (HDPE). This comparatively soft and elastic inner shell 6 is then surrounded by the outer sleeve 7 that is typically formed from a fiber-reinforced material. A structure of carbon fibers is typical for the structure of the outer sleeve 7, the carbon fibers being pre-impregnated with a bonding agent or resin or being soaked therein before application to the inner shell 6. The outer sleeve 7 can thereby consist of long fiber strands that are wound, for example, in the production of the compressed gas storage element 5 around the inner shell 6, the so-called liner. The structure thus has a very high mechanical stability with very low specific weight. Frequently, connection elements 8, so-called domes, composed of metal material, for example aluminum, are arranged in one or both of the end regions, the domes comprising the connections for filling and removing the hydrogen $H_2$ from the compressed gas storage element 5. In the illustration of FIG. 2, merely one connection element 8 is shown on a side of the compressed gas storage element 5.

Both the material of the inner shell 6 and also the material of the outer sleeve 7 can typically not be formed so that it keeps the hydrogen $H_2$ inside the compressed gas storage device 5 securely and reliably over a long period. A very small quantity of hydrogen $H_2$ will typically always diffuse through the inner shell 6 and the outer sleeve 7 from the compressed gas storage element 5 so that negligible losses of hydrogen $H_2$ are unavoidable. The very small quantities of hydrogen $H_2$ that diffuse during normal operation of the compressed gas storage element 5 in the vehicle 1 through the compressed gas storage element 5 are thereby comparatively uncritical and simply flow into the environment. It only becomes critical or problematic when higher concentrations of hydrogen $H_2$ diffuse through the walls of the compressed gas storage element 5 and thus, due to the comparative high hydrogen concentration in the environment of the compressed gas storage element 5, the formation of an ignitable mixture or the formation of detonating gas is to be feared. In order to detect such critical concentrations, therefore, hydrogen sensors are nearly always present, which trigger an alarm as well as possibly a system disconnection upon exceeding of threshold concentrations.

During the operation of the vehicle 1, the compressed gas storage element 5 will empty further and further through the hydrogen consumption of the fuel cell 4, whereby the pressure inside the inner shell 6 reduces correspondingly. Hydrogen $H_2$ that has already diffused through the inner shell 6 can then collect in particular in this situation in somewhat larger quantities between the inner shell 6 and the outer sleeve 7. In case of a comparatively empty inner shell 6 and thus comparatively low pressure in the compressed gas storage element 5, this gas that has collected between the inner shell 6 and the outer sleeve 7 will remain in this region for a comparatively long time. If the vehicle 1 is then subjected to filling of the compressed gas storage element 5, fresh hydrogen $H_2$ with a pressure of 700 bar is fed via the connection 8 into the region of the compressed gas storage element 5. The pressure inside the inner shell 6 thereby increases comparatively rapidly to this 700 bar. The cushions of hydrogen $H_2$ formed in the region between the inner shell 6 and the outer sleeve 7, the cushions having diffused through the inner shell 6, are thereby pressed in case of a conventional structure through the outer sleeve 7 to outside of the compressed gas storage element 5 so that here, within a very short time span, a very high concentration of hydrogen $H_2$ suddenly arises. This then typically triggers the safety alarm, which goes hand in hand with a system disconnection and in particular an interruption in the filling process. Since, in these situations, however, no actual leakage of the compressed gas container 5 is present, but instead merely an increased hydrogen concentration has arisen due to the structural properties of the compressed gas container 5, this safety alarm and in particular the emergency disconnection constitute a very annoying process.

In the illustration of FIG. 2, therefore, valve means 9 can be seen in the region between the inner shell 6 and the outer sleeve 7, the valve means 9 connecting the region between the inner shell 6 and the outer sleeve 7 to the inside of the inner shell 6. One of the valve means 9 is thereby arranged for example in the cylindrical region of the compressed gas storage element 5, the other of the valve means 9 is drawn in for example in the region of the connection element 9. The two valve means 9, of which in principle only one or more can be distributed over the compressed gas storage means 5, are thereby valve means 9 with backflow prevention means. They are designed so that the hydrogen $H_2$ present inside the inner shell 6 cannot pass in the normal operating state through the valve means 9. If diffusion of the hydrogen $H_2$ inside the inner shell 6 arises through this inner shell 6 into the region between the inner shell 6 and the outer sleeve 7, the hydrogen $H_2$, or at least the hydrogen $H_2$ which has not yet diffused through the outer sleeve 7 and flowed away, can collect in the region between the inner shell 6 and the outer sleeve 7.

If the vehicle is operated with the hydrogen $H_2$ from the compressed gas storage element 5, the compressed gas storage element 5 will become increasingly empty with time. If it is completely or almost empty, it will have a pressure inside the inner shell 6 that is comparatively low. In these conditions, in which filling is typically directly imminent, the gas between the inner shell 6 and the outer sleeve 7 will flow via the valve means 9 with backflow prevention means back into the region within the inner shell 6, and indeed as soon as the pressure inside the inner shell 6 becomes lower or significantly lower than in the region between the inner shell 6 and the outer sleeve 7. The gas flowing back into the region of the inner shell 6 is not therefore lost and can be reused. The particular effect is, however, that after such a situation a filling of the compressed gas storage element 5 typically takes place in a timely manner. Since, previously, due to the low pressure inside the inner shell 6, the hydrogen $H_2$ present between the inner shell 6 and outer sleeve 7 has flowed back into the inside of the inner shell, this hydrogen $H_2$ cannot—in case of a pressure increase inside the inner shell 6, as arises during filling typically within a very short time span—be pressed back through the outer sleeve 7, as it has already flowed back beforehand through the valve means 9 into the inside of the inner shell 6.

Figure 3:
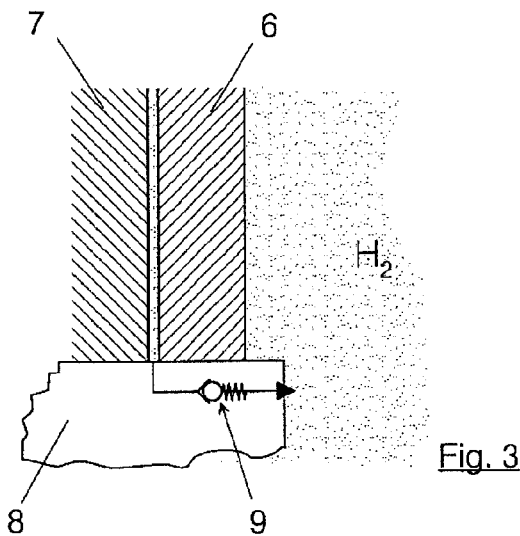
FIG. 3 shows a first embodiment of a valve means according to the invention.

In the illustration of FIG. 3, a first possible embodiment for such a valve means 9 is indicated in principle. In the illustration of FIG. 3, a part of the inner shell 6 and a part of the outer sleeve 7 can be seen as a cut-out from the connection element 8. The region between the inner shell 6 and the outer sleeve 7 is connected via a line element in the connection element 8 to the inside of the inner shell 6. In the region of the line element, the valve means 9 is arranged as a spring-loaded non-return valve of simple structure. Such a spring-loaded non-return valve of simple construction is thereby known in itself and usual, so that merely the symbols used for this are given here and no constructive details must be indicated. Such a non-return valve with spring loading can thereby be designed integrated into the region of the connection element 8. In principle a simple non-return valve without spring loading would also fulfill the object according to the invention in any case. In particular in case of a type IV compressed gas storage element with an inner shell 6 made of plastic, the inner shell 6 has a certain flexibility and transfers the pressure present inside in the manner of a membrane to the region between the inner shell 6 and the outer sleeve 7. Therefore, this can lead in different situations to an equal or virtually equal pressure between the two regions. In this situation the valve means 9 could then open for a short time with negligible pressure differences so that, due to negligible pressure fluctuations, an outflow of hydrogen $H_2$ through the valve means into the region between the inner shell and outer sleeve 7 could arise. In order to securely and reliably avoid this, the valve means 9 can be formed as a spring-loaded non-return valve. Through the spring, the valve means can then be held in its "closed" position so that, only in case of a pressure difference which additionally overcomes the force of the spring, a backflow of the hydrogen $H_2$ out of this region into the inside of the inner shell 6 is possible.

Figure 4:
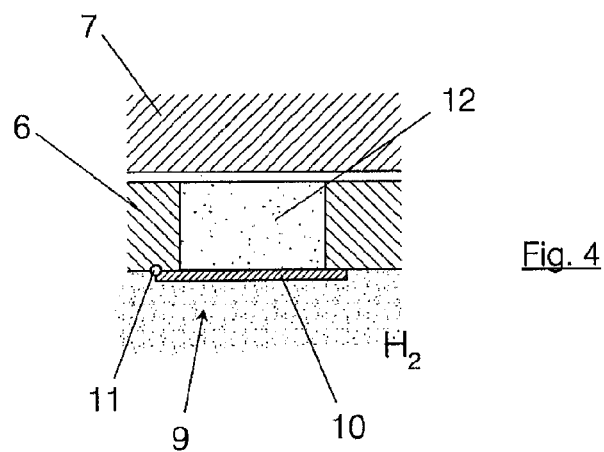
FIG. 4 shows a second embodiment of a valve means in a first state.

In the illustration of FIG. 4 an alternative embodiment of the valve means 9 can be seen. A section of the inner shell 6 and the outer sleeve 7 is also shown here. The valve means 9 consists in this case of a single flap 10 which is connected via a rotation point 11 to the inner shell 6. The flap thereby lies on an opening 12 through the inner shell 6 so that the flap 10 seals the opening 12 so long as the pressure inside the inner shell 6 is greater than the pressure between the inner shell 6 and the outer sleeve 7. Here also, this seal can be reinforced by a spring, which can be formed for example as a torsion spring in the region of the rotation point 11.

Figure 5:
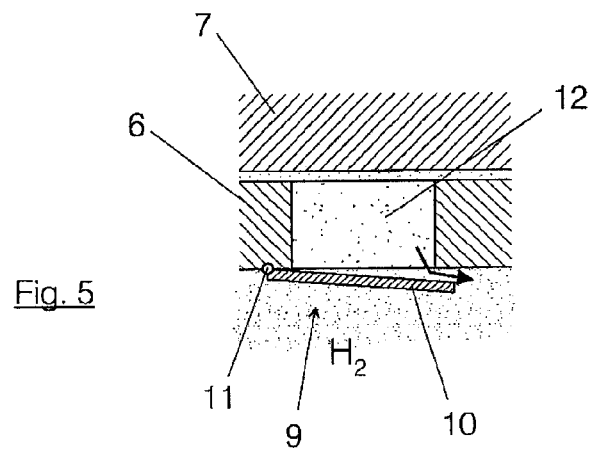
FIG. 5 shows a second embodiment of a valve means in a second state.

In the illustration of FIG. 5, the same structure as in FIG. 4 can be seen again, whereby here a state is shown in which the pressure is higher in the region of the opening 12 and between the inner shell 6 and the outer sleeve 7 than inside the inner shell 6. Such a situation will typically arise when the compressed gas storage element 5 is comparatively empty and the pressure inside the inner shell 6 correspondingly falls. In this situation the flap 10 opens around the rotation point 11 and thus allows the hydrogen $H_2$ under higher pressure in the region between the inner shell 6 and the outer sleeve 7, as indicated by the arrow, to flow back into the region within the inner shell 6. In this situation, which typically arises before a re-filling of the compressed gas storage element 5, a backflow of the hydrogen $H_2$ out of the region between the inner shell 6 and the outer sleeve 7 can be achieved. The hydrogen $H_2$ flowing back is not therefore lost but instead remains available. In particular, however, a hydrogen cushion between the inner shell 6 and the outer sleeve 7 is removed or significantly reduced in its volume. In case of a pressure impact of the inner shell 6 through filling, this hydrogen cushion 6 can be prevented from being pressed through the outer sleeve 7 as the cushion is no longer present or only present in such a low quantity that hydrogen leaving does not trigger an alarm and does not cause any safety-critical conditions.

The structure, as described here, thus allows with very simple and thus comparatively cost-effective valve means 9 an automatic backflow of the gas cushions in the region between the inner shell 6 and the outer sleeve 7 directly before re-filling of the compressed gas storage element 5 if the pressure conditions inside the inner shell 6 become so low through a compressed gas storage element 5 emptying during operation that the valve means 9 releases the flow path, preferably against a spring force.

The valve means 9 are thereby integrated either into the region of the connection element 8 or structurally inside the inner shell 6 so that the outer sleeve 7—as in the case of conventional inner shells 6 without such structures—can be wound around without bulges or recesses in the region of the outer sleeve 7 becoming necessary. A simple and secure structure can thus be achieved. In addition the integration or the at least predominant structural integration of the valve means 9 inside the inner shell 6 facilitates a very secure structure, as structures projecting over the inside of the inner shell 6 and the outer sleeve 7 could be very easily damaged, for example during incorporation or particularly in case of accidents or the like. This can lead to a leak in the gas storage element 5 with the corresponding safety risk.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A device for storing low molecular gases under high pressure, the device comprising:
   an enclosed inner shell;
   at least one enclosed outer sleeve having an inner side surrounding the inner shell and an outer side exposed to an environment outside of the device;
   a connection element having a first side exposed to the environment outside of the device and a second side exposed to an inside of the enclosed inner shell, wherein the connection element is configured to allow filling and removing the low molecular gas from the inside of the enclosed inner shell;
   a backflow prevention valve arranged in the connection element in a region between the enclosed inner shell and enclosed outer sleeve so that it connects the region between the enclosed inner shell and enclosed outer sleeve to the inside of the enclosed inner shell in such a way that low molecular gas that diffused through the enclosed inner shell flows back into the enclosed inner shell under certain pressure conditions.

2. The device according to claim 1, wherein the valve is pre-tensioned via a spring in a closed state of the valve.

3. The device according to claim 1, wherein the valve is a non-return valve.

4. The device according to claim 1, wherein the enclosed inner shell is plastic.

5. The device according to claim 1, wherein the at least one enclosed outer sleeve is composed of a fiber-reinforced material.

6. The device according to claim 1, wherein the low molecular gas is hydrogen.

7. The device according to claim 1, wherein the device is configured to store the low molecular gas at a pressure of more than 350 bar.

8. The device according to claim 1, wherein the low molecular gas is fuel for a vehicle.

9. The device according to claim 8, wherein the vehicle is a fuel cell vehicle.

* * * * *